United States Patent

[11] 3,550,767

| [72] | Inventor | Harry J. Halewijn<br>Cochituate, Mass. |
|---|---|---|
| [21] | Appl. No. | 825,338 |
| [22] | Filed | May 16, 1969 |
| [45] | Patented | Dec. 29, 1970 |
| [73] | Assignee | Synergistics Inc.<br>East Natick, Mass.<br>a Corporation of Massachusetts. by mesne assignment |

[54] PHOTOGRAPHIC FILM-REEL CONTAINER
3 Claims, 5 Drawing Figs.

[52] U.S. Cl. .................................................... 206/52,
242/55.53
[51] Int. Cl. .................................................... B65d 85/67
[50] Field of Search ......................................... 206/52,
52(F), 52W, 59(A), 59(B), 64; 242/71.8, 55.53

[56] References Cited
UNITED STATES PATENTS

| 2,301,920 | 11/1942 | Sadler .......................... | 206/52 |
| 2,486,247 | 10/1949 | Berlin et al. ................. | 206/52(W) |
| 2,529,501 | 11/1950 | Johnston ..................... | 242/71.8(A) |
| 2,824,709 | 2/1958 | Macy ............................ | 206/52(WUX) |
| 3,136,415 | 6/1964 | Sandstrom................... | 242/55.53 |

*Primary Examiner*—William T. Dixson, Jr.
*Attorneys*—Burgess, Dinklage & Sprung and Lee A. Strimbeck ABSTRACT: A photographic film-reel container employing a hollow cylindrical hub having a flexible disklike flange mounted on each end of the hub. At the outer periphery of each flange and generally orthogonal to the plane of the flange is a circumferential lip extending inward toward the other flange. When the flanges are in the first of two stable positions, the device is a lighttight container for transporting film. When the flanges are in the second stable position, the film can be transferred to and from the device.

PATENTED DEC 29 1970  3,550,767
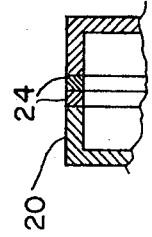
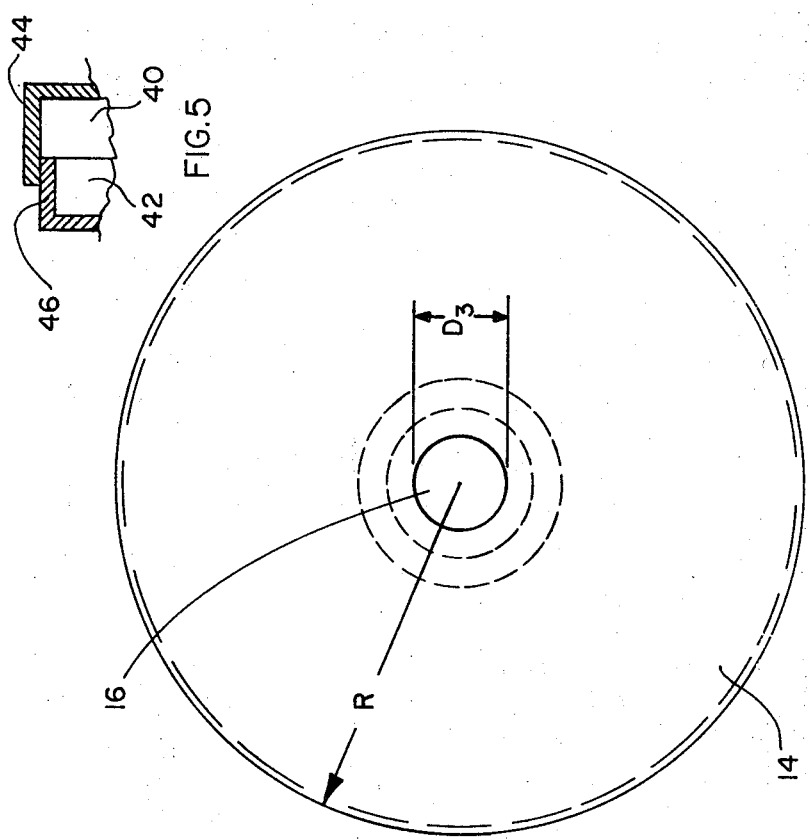
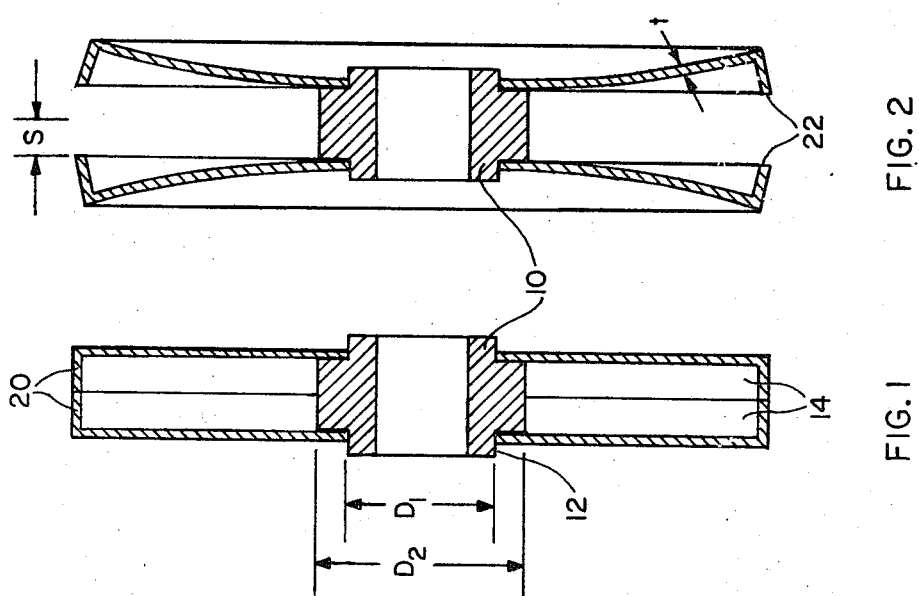
INVENTOR.
HARRY J. HALEWIJN
BY David M. Keay
AGENT

PHOTOGRAPHIC FILM-REEL CONTAINER

BACKGROUND OF THE INVENTION

The invention relates to reels and storage containers for recording mediums and, in particular, to a combination reel and storage container useful, for example, in handling photographic film.

Recording mediums, such as photographic film, magnetic tapes and paper punched tapes, are usually wound on reels and the combination placed in separate containers for storage and/or shipment. In handling photographic or light sensitive film, the container and reel must not only be structurally sound to protect the film but the container must also be impenetrable by light to preclude exposing the film.

Conventional devices for providing a combination storage device and reel, to thereby eliminate the use of a separate storage container, include the well-known film cartridge in which the film is transferred to and from the reel portion via a slot in periphery of the cartridge. During transfer of the film to and from the cartridge, drag is experienced as the surfaces and edges of the film come in contact with the edges of the container near the slot. This drag causes no difficulty in the usual photographic application because any vibrations caused by the dragging are suppressed by tightly clamping the film in a film gate during the recording operation. This clamping causes an intermittent motion of the film in a typical motion picture camera.

In a film recorder in which the film is required to be in constant motion during the recording cycle, such as a recorder employing a laser, it is not readily feasible to suppress the vibrations caused by the rubbing of the film against the cartridge. If these vibrations are not eliminated or suppressed, unfaithful recording and reproduction of the recorded data results.

It is, therefore, an object of this invention to provide a device which can be employed as a combination reel and a light impenetrable container while at the same time eliminating friction and drag between the film and the container during transfer of the film to and from the container.

SUMMARY OF THE INVENTION

Briefly, the device according to the present invention employs a hollow cylindrical hub having a first diameter at each end on which a flexible means, typically a metallic disc is mounted. The discs have two stable positions, one of which the plane of the disc is generally orthogonal to the longitudinal axis of the hub and a second position in which the outer circumference of the discs travel in opposite directions a sufficient distance to permit frictionless winding and unwinding of a recording medium, such as photographic film from the device. On the outer periphery of each disc, generally parallel to the longitudinal axis of the hub, is a circumferential lip extending toward the lip of the other disc so as to form a light impenetrable container when the disc is in the first of the two positions.

BRIEF DESCRIPTION OF THE DRAWINGS

This invention will be more fully described in the following detailed description read in conjunction with the accompanying drawings, in which:

FIG. 1 is a sectional end view of an embodiment according to the present invention of a lighttight container in the closed position;

FIG. 2 is a sectional end view of the embodiment of FIG. 1 in the open position;

FIG. 3 is a side view of the embodiment of FIG. 1;

FIG. 4 is a type of a light seal which can be employed with a lighttight container; and FIG. 5 is another type of light seal that can be employed with a lighttight container.

DETAILED DESCRIPTION OF THE INVENTION

A combination reel and light impenetrable container according to the present invention is shown in the closed position in FIG. 1 and in the open position in FIG. 2. A cylindrical hub 10 has a first diameter $D_1$ at its two ends and a larger diameter $D_2$ recessed from the ends forming a circumferential L-shaped channel 12 at each end of the hub 12. A pair of disc members 14, a side view of which is shown in FIG. 3, each having a circular opening 16 of a predetermined diameter $D_3$, are mounted at the ends of the hub 10 in the circumferential channels 12. The surface 18 of the hub 10 separating the disc members 14 has a width at least equal to that of a recording medium to be wound on the hub 10.

The diameter $D_3$ of the circular opening 16 is slightly less than the diameter $D_1$ of the end of the hub 10. By forcing the end of the hub 10 through the smaller circular opening, stresses are set up within the disc member causing the disc to assume either one of two stable positions. In the first position, the disc members are generally orthogonal to the longitudinal axis of the hub, and in the second position, the outer peripheries of the disc members move apart. The stresses set up within the disc members cause an "oil canning" effect in the disc shown in FIG. 2.

Each disc member 14 has at its outer periphery a circumferential lip 20 extending inward along the direction of the longitudinal axis of the hub 10. Preferably, the lip 20 is orthogonal to the plane of disc member 14 when the container is closed. The length of the lip 20 is substantially equal to half the distance defined by surface 18 such that the edges 22 of the lips 20 are in contact with each other when the container is closed thereby forming a light impenetrable container.

A circular piece of light sealing material 24, such as felt, may be used to form the edge 22 of either one or both of the lips 20, as shown in FIG. 4. The addition of the sealing material 24 improves the light sealing qualities of the container and reduces the accuracy requirements of the length of the lips 20.

A third type of light seal to be employed with the embodiment of FIG. 1 is shown in FIG. 5. One of the disc members 40 has a slightly larger diameter than that of the other disc member 42. One of the lips, for example lip 44, overlaps the other lip 46 forming a light impenetrable container.

The edges 22 of the lips 20, as shown in FIG. 2, must travel a distance S which is at least one-half the width of the recording medium to be wound on the surface 18 of the hub 10. The distance, S, is related to the radius R of the disc member 14 and the difference in diameter $D_1$ of the hub 10 and the diameter $D_3$ of the disc member 14 and inversely related to the thickness, $t$, of the disc member 14. For example, the displacement S is equal to .25 inches for a .06-inch thick aluminum disc in which $D_3 = 3.0$ inches and the radius $R = 5.0$ inches and for a hub 10 having a diameter $D_1 =$ to 3.008 inches.

It has been shown that a combination reel and light impenetrable container has been developed by press fitting a disc member on to each side of a hub thereby causing the disc members to have two stable positions, namely an open and closed position.

I claim:

1. A device for storing a recording medium employing:
   a hollow cylindrical hub having a first predetermined diameter at each end and a longitudinal axis of predetermined dimension; and
   flexible means mounted on the ends of said hollow cylindrical hub and having first and second stable positions, said flexible means forming in combination with said hub a chamber for enclosing said recording medium when said means is in the said first stable position and for permitting removal of the recording medium when said means is in said second stable position, said flexible means including:
   first and second disc members of predetermined diameter, each having a circular opening of predetermined diameter in the center portion thereof and being mounted on one end of said hollow cylindrical hub through said circular opening generally orthogonal to the longitudinal axis of said hollow cylindrical hub, said predetermined diameter of said circular opening being slightly less than the first predetermined diameter of said hollow cylindrical hub whereby stresses are set up within said disc members causing each disc member to have first and second stable positions; and a circumferential lip attached to the outer periphery of each of said first and second disc members and extending inwardly along the longitudinal axis of said hub, said lip being of sufficient length to contact the lip of the other disc member when each of said disc members is in said first stable position.

2. A device for storing a recording medium according to claim 1 wherein said flexible means includes:

first and second disc members of predetermined diameter, each having a circular opening of predetermined diameter in the center portion thereof and being mounted on one end of said hollow cylindrical hub through said circular opening generally orthogonal to the longitudinal axis of said hollow cylindrical hub, said predetermined diameter of said circular opening being slightly less than the first predetermined diameter of said hollow cylindrical hub whereby stresses are set up within said disc members causing each disc member to have first and second stable positions; and a circumferential lip attached to the outer periphery of each of said first and second disc members and extending inwardly along the longitudinal axis of said hub, said lip being of sufficient length to contact the lip of the other disc member when each of said disc members is in said first stable position.

3. A device for storing a recording medium according to claim 2 wherein the edge of said circumferential lip includes an annular piece of resilient opaque material.